United States Patent
Chappalgaon et al.

(10) Patent No.: US 10,169,222 B2
(45) Date of Patent: *Jan. 1, 2019

(54) APPARATUS AND METHOD FOR EXPANDING THE SCOPE OF SYSTEMS MANAGEMENT APPLICATIONS BY RUNTIME INDEPENDENCE

(71) Applicant: International Business Machines Corporation, Armonk, NY (US)

(72) Inventors: Praveen S. Chappalgaon, Chikkalsandra (IN); Rose Lopez-Carreno, Cary, NC (US); Brian Nelson, Austin, TX (US); Marcelo Perazolo, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,935

(22) Filed: Nov. 14, 2017

(65) Prior Publication Data

US 2018/0067846 A1 Mar. 8, 2018

Related U.S. Application Data

(63) Continuation of application No. 14/868,713, filed on Sep. 29, 2015, now Pat. No. 9,892,029.

(51) Int. Cl.
G06F 9/44 (2018.01)
G06F 11/36 (2006.01)
(Continued)

(52) U.S. Cl.
CPC .......... *G06F 11/3688* (2013.01); *G06F 8/313* (2013.01); *G06F 8/70* (2013.01);
(Continued)

(58) Field of Classification Search
CPC .......... G06F 11/30–11/3696; G06F 8/60–8/78
See application file for complete search history.

(56) References Cited

U.S. PATENT DOCUMENTS

| | | | |
|---|---|---|---|
| 8,490,055 B2* | 7/2013 | Basak | G06F 11/323 717/123 |
| 8,655,623 B2* | 2/2014 | Duyanovich | G06F 11/0709 702/182 |

(Continued)

OTHER PUBLICATIONS

Shafiq, M. Omair et al., "AgentWeb Gateway—A middleware for dynamic integration of Multi Agent System and Web Services Framework," pp. 1 -2. (Year: 2005).*

(Continued)

*Primary Examiner* — Benjamin C Wu
*Assistant Examiner* — Christopher J Franco
(74) *Attorney, Agent, or Firm* — Cantor Colburn LLP; Steven Meyers

(57) ABSTRACT

An apparatus for automatic conversion of existing systems management software applications to run in multiple middleware runtime frameworks by automating the unification of runtime framework ontologies and isolating runtime dependent code in the build process of system management applications through the introduction of a runtime dependency processor and performing runtime dependency analysis.

9 Claims, 2 Drawing Sheets

(51) Int. Cl.
*G06F 8/70* (2018.01)
*G06F 9/448* (2018.01)
*G06F 8/76* (2018.01)
*G06F 8/30* (2018.01)
*G06F 8/41* (2018.01)

(52) U.S. Cl.
CPC .............. *G06F 8/76* (2013.01); *G06F 9/4496* (2018.02); *G06F 11/3604* (2013.01); *G06F 11/3636* (2013.01); *G06F 8/433* (2013.01); *G06F 11/3676* (2013.01)

(56) References Cited

U.S. PATENT DOCUMENTS

| | | | | |
|---|---|---|---|---|
| 8,732,673 B2 * | 5/2014 | Finking | G06F 11/3624 | |
| | | | 717/126 | |
| 9,389,986 B2 * | 7/2016 | Abraham | G06F 11/3676 | |
| 2008/0195369 A1 * | 8/2008 | Duyanovich | G06F 11/0709 | |
| | | | 703/22 | |
| 2012/0072887 A1 * | 3/2012 | Basak | G06F 11/323 | |
| | | | 717/123 | |
| 2012/0151453 A1 * | 6/2012 | Finking | G06F 11/3612 | |
| | | | 717/130 | |
| 2014/0331206 A1 * | 11/2014 | Abraham | G06F 11/3688 | |
| | | | 717/124 | |
| 2017/0091083 A1 | 3/2017 | Chappalgaon | | |

OTHER PUBLICATIONS

Zhang, Charles et al., "Resolving Feature Convolution in Middleware Systems," pp. 188-205. (Year: 2004).*
Woodside, Murray et al., "The Future of Software Performance Engineering," pp. 1-17. (Year: 2007).*
Hasselbring, William et al., "Information System Integration," pp. 33-38. (Year: 2000).*
Hacigumus, Hakan et al., "Middleware Support for Auditing Service Process Flows," pp. 24-29. (Year: 2006).*
Padmanabh, Kumar et al., "MOJO: A Middleware That Converts Sensor Nodes into Java Objects," pp. 1-6. (Year: 2010).*
List of IBM Patents or Patent Applictions Treated As Related; (Appendix P), Filed Nov. 14, 2017, 2 pages.

* cited by examiner

APPARATUS AND METHOD FOR EXPANDING THE SCOPE OF SYSTEMS MANAGEMENT APPLICATIONS BY RUNTIME INDEPENDENCE

DOMESTIC PRIORITY

This application is a continuation of U.S. patent application Ser. No. 14/868,713, filed Sep. 29, 2015, the content of which is incorporated by reference herein in its entirety.

BACKGROUND

The present invention relates to systems management, and specifically to an apparatus and method for automatic conversion of existing systems management software applications to run in multiple middleware runtime frameworks, such that multiple middleware runtime frameworks may be run without a full rewrite of their application source code.

A formidable problem an Automatic Test System (ATS) maintainer faces in the management of the system throughout its life cycle is when the computer system that runs the ATS station becomes obsolete. Even if the rest of the station is usable, the test program set (TPS) cannot be executed and the station cannot be controlled. Therefore, the entire ATS becomes unusable. This ultimately reaches a decision point on whether to support on-going activities; solutions that can prove costly and time consuming.

Systems management is a highly diversified area. There are numerous vendors of hardware components and many vendors of systems management software components. Lately, systems management software has seen high commoditization and movement towards middleware runtime frameworks, such as those based on IBM's WebSphere Application Server, Apache Tomcat, OSGi, Project Zero, and the Spring Framework, among others. Middleware is a computer software program that provides services to software applications beyond those available from the operating system. Generally described, it is the software layer that lies between the operating system and applications on each side of a distributed computing system in a network. Services that can be regarded as middleware include enterprise application integration, data integration, message oriented middleware (MOM), object request brokers (ORBs), and the enterprise service bus (ESB), to name a few.

With this shift to middleware runtime frameworks, it becomes more and more difficult for vendors of systems management software to support the multiple middleware runtime frameworks required by their customers. The situation aggravates exponentially when customers buy hardware parts from different vendors that require different system management components to be managed, and these components are based on (and only available on) different middleware runtime frameworks. Normally a big part of each system's management application would have to be rewritten to support multiple middleware runtime frameworks, which translates to high costs of development and maintenance.

As an example, management of a computer update must include consideration of the multitude of issues relating to the legacy software for an automatic test system (ATS). There remain several issues with regard to protecting the legacy data embedded within an individual Unit Under Test (UUT).

In many cases the source data for the various UUTs is not available to re-develop a test program set (TPS), either because the data was not purchased, or the UUT was so old that the data was no longer available.

Because of the radical difference in basic development concepts, an extensive re-development effort for the existing test program sets would necessarily be required, which is a timely and burdensome approach. Furthermore, it is not uncommon for many of the TPSs written for the existing UUTs that operate on automatic test system stations to have been through an extensive Independent Validation & Verification process. If a major redevelopment of the TPS were to occur, then this process would also have to be considered again as well which would be expensive and time consuming.

Considering these factors, the re-host and update of existing automatic test system stations is best served by a solution that will impact the existing legacy data (embedded in the individual UUT TPS) as little as possible.

One solution to this problem is to develop middleware that accomplishes this feat without impacting the legacy, underlying software programs. For example, U.S. Patent Publication No. 2013/0145348, titled "UNIVERSAL AND ADAPTIVE SOFTWARE DEVELOPMENT PLATFORM FOR DATA-DRIVEN APPLICATIONS," discloses a platform-independent application programming interface and a software application that is independent of the rendering medium. Thus, the prior art recognizes the possibility to develop applications that can run across operating system platforms; however, applications that are capable of abstracting different presentation media are rare if not non-existent.

Independence from the runtime platform is achieved by two means. First, the application platform represents a concise architecture with a corresponding application programming interface (API). The adherence to the API contract guarantees compatibility with the framework and desired results from the underlying platform. Secondly, the default implementation of the API is written in a language supported in multiple platforms, such as Java; however, implementations in other platform-independent languages such as C# and C++ can also be constructed.

Using a persistence layer in the application configured to abstract access to a database residing on a physical storage medium, the persistence layer is capable of abstracting access to data records adaptively at runtime without hard-coding specific information about each record type.

It is noted that the '348 Publication does not teach a collection of ontologies associated with target runtime framework, or an algorithm that identifies runtime functions.

In U.S. Patent Publication No. 2008/0216050, titled "METHOD AND SYSTEM FOR ACCESSING A RESOURCE IMPLEMENTED IN A COMPUTER NETWORK," A method and system for accessing a resource transparently from a client perspective is taught, which makes the access method independent of the underlying runtime environment.

The '050 Publication implements runtime and platform independent steps which can be advantageously supported by specific tooling in one of the prior art development environments. By means of this approach, a developer is allowed to remain in the platform and runtime independent "arena" as generalized or generically available interfaces are used to do the implementation of the web service itself.

The prior art, however, is silent with respect to providing a method for automatic conversion of existing systems management software applications to run in multiple middleware runtime frameworks without a full rewrite of their application source code. It is also does not teach or suggest collecting ontologies (metadata that describes the elements and behavior of a model) associated with each supported target runtime framework; nor an algorithm for identifying runtime-dependent functions/methods/arguments in these components.

SUMMARY

Bearing in mind the problems and deficiencies of the prior art, it is therefore an object of the present invention to manage computer updates to legacy software for automated test equipment utilizing different middleware runtime frameworks.

It is another object of the present invention to develop middleware independent of the runtime platform through the implementation of a persistence layer that accesses the database.

It is yet another object of the present invention to provide a method for automatic conversion of existing systems management software applications to run in multiple middleware runtime frameworks.

The above and other objects, which will be apparent to those skilled in the art, are achieved in the present invention which is directed to an apparatus for automatic conversion of existing systems management software applications to run in multiple middleware runtime frameworks comprising: a plurality of system management components; a scanner for scanning the system management components; a plurality of ontologies each associated with individual runtime frameworks analytically describing the runtime framework functions, methods, or arguments; an algorithmic component identifying and analyzing runtime dependent functions, methods, or arguments in the system management components by performing a runtime dependency analysis, and isolating the system management components using delegation and factor object patterns to form isolation layers; a runtime mapping module for unifying the plurality of ontologies using data from the runtime dependency analysis, and forming a mapping table of equivalent functions, methods, or arguments between each supported target runtime; a runtime dependency processing module that applies data from the mapping table into the isolation layers.

The runtime dependency processing module output is applied to a collection of isolated logic code that delegates the runtime dependent functions, methods, or arguments to runtime independent proxy components supported by runtime dependent implementations. The runtime dependent implementations support each of the runtime independent proxy components.

The runtime dependency analysis iterates through each of the system management component source code to identify members and methods that are runtime dependent.

The algorithmic component performs model unification of two or more ontologies such that a unified ontology includes a mapping of runtime dependent member functions to semantic counterparts.

The model unification may be dictionary-based, structure-based, or a combination thereof. The dictionary-based model unification includes assigning a semantic meaning of an ontological element and comparing the semantic meaning to other ontological elements by identifying semantically equivalent constructs. The structure-based model unification includes forming a relationship between system management components and combining two or more distinct sub-structures.

An output of the algorithmic component is combined with an output of the runtime mapping module unification to form an automatic proxy substitution mapping for each runtime dependent code in each system management component.

The runtime dependency processing module utilizes the mapping table to automatically refactor each system management component into two modules: a runtime independent module and a runtime dependent proxy module. The runtime independent module replaces runtime dependent code with runtime independent code counterparts. The runtime dependent proxy module implements the runtime independent code counterparts, transferring runtime framework dependencies to the runtime dependent proxy modules.

In a second aspect, the present invention is directed to a method for automatic conversion of existing systems management software applications to run in multiple middleware runtime frameworks comprising: scanning the frameworks of system management components to form individual function modules; mapping application program interface calls to a generic applicant program interface call layer by creating an association of the individual function modules; performing runtime dependency analysis by generating ontology alignment mechanisms and outputting a mapping table of ontologies; performing model unification by mapping runtime dependent functions to semantic counterparts using the ontology alignment mechanisms; and generating multiple runtime independent proxy components for the system management components.

The method further includes utilizing a runtime dependency processing module to read unified ontologies and generate the multiple runtime independent proxy components from mapping relationships.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION

Figure 1:
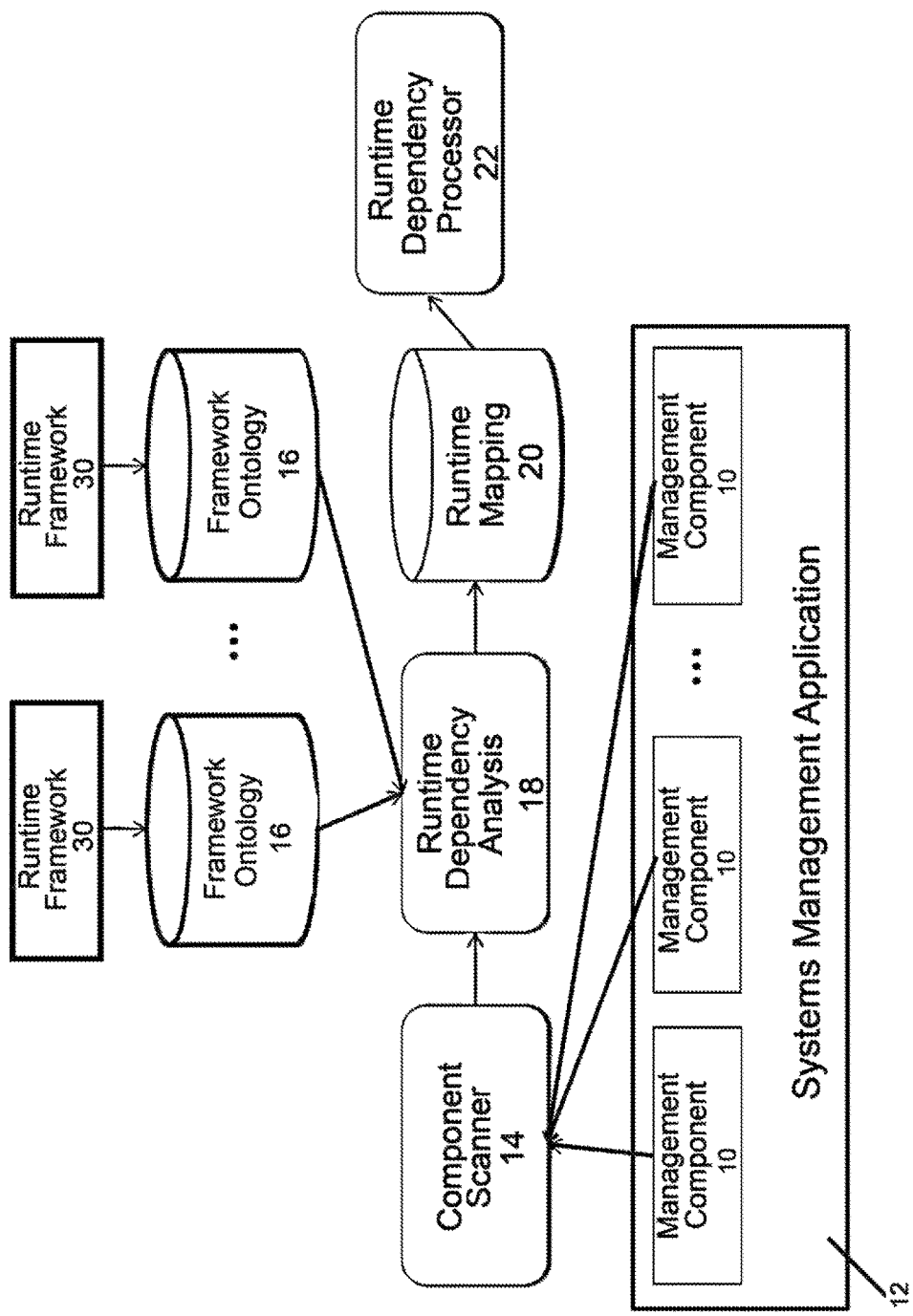
FIG. 1 depicts an architectural scheme for expanding the scope of systems management applications by runtime independence.

In describing the one or more embodiments, reference will be made herein to FIGS. 1-2 of the drawings in which like numerals refer to like features of the invention.

The present invention relates to providing a method for automatic conversion of existing systems management software applications to run in multiple middleware runtime frameworks without a full rewrite of their application source code. FIG. 1 depicts an architectural scheme for expanding the scope of systems management applications by means of runtime independence. Specifically, it illustrates how various elements are related (tied together) to achieve automated runtime independence in systems management applications.

A plurality of system management components 10 forms a systems management application 12. A component scanner 14 scans the systems management components 10 and the associated hardware elements they support. The component scanner 14 iterates over the entire product source tree and separates each element that composes the system management framework. For each different kind of runtime framework, the definition of component may be different. For example, in OSGi each element is known as a "bundle" and contains specific interfaces that can be identified by a code scanner. Different runtime frameworks will need slightly different algorithms that identify their corresponding components in the product source tree. This identification may be achieved by analyzing part of the runtime framework ontology, where the definition of what is a component may be fed to the scanner in order to facilitate the identification. It may also be implemented on a per-runtime framework basis where the identification is hardcoded to the way components are defined per the runtime framework. In either case, the output of the component scanner will be source code associated with each singular management component that is part of the systems management application.

A collection or framework of ontologies 16 is associated with each supported target runtime framework, which fully delineates their functions/methods/arguments. As noted above, ontology is a collection of metadata that describes the elements and the behavior of a model. The present invention isolates the characteristics and behavior of each runtime framework model in a collection of metadata descriptors that are then used for a subsequent unification process. Tools that facilitate the creation of ontologies are utilized, for example, ontology editors using open source code and framework platforms to construct domain models and knowledge-based applications with ontologies, such as, for example, Protégé from Stanford University.

An algorithmic component 18 is implemented to identify and analyze runtime-dependent functions/methods/arguments, that is, perform runtime dependency analysis in management components 10 and isolate them using delegation and factory object patterns. Runtime dependency analysis performs three distinct functions. First, runtime isolation is effectuated. The runtime dependency analysis iterates through each management component 10 source code and identifies methods and other members that are runtime dependent. It then compares the names defined in each runtime framework ontology to those in the code tree. The location where these runtime dependent members are used is recorded for later use.

Model unification is also performed. A runtime framework agnostic ontology is derived by performing ontological unification of two or more ontologies. The unified ontology contains a mapping of runtime dependent member functions to their semantic counterparts in the unified ontology.

A runtime mapping mechanism 20 unifies (or aligns) ontologies 16 using data from the runtime dependency analysis 18, and creates a streamlined mapping table of equivalent functions/methods/arguments between each support target runtime. For example, in one runtime framework lifecycle functions could be defined as "startup" and "shutdown". In another, they might be called "start", "stop", and "restart". In the preferred ontology, "start" would be mapped to "startup", "stop" would be mapped to "shutdown", and "restart" would be mapped to both "startup" and "shutdown" in sequence.

There are basically three approaches to ontology unification: a dictionary-based approach; a structure-based approach; and a hybrid approach. In a dictionary-based approach, the semantic meaning of an ontological element is compared to others by identifying semantically equivalent constructs (in a manner akin to synonyms in the English Dictionary). In a structure-based approach, the relationships between components are analyzed and then unification or alignment is performed by combining two or more distinct sub-structures. For example, we know from ontology 1 that "shutdown" comes after "startup", and in ontology "stop" comes after "start". Therefore, a possible structure unification would be that "shutdown" is equivalent to "stop" and that "startup" is equivalent to "start". In a hybrid approach, both dictionary-based and structure-based ontology unification methodologies are used together to improve accuracy of the unified model.

The output of the runtime isolation step is combined with the output of the ontology unification step to form an automatic proxy substitution mapping for every piece of runtime dependent code in each management component. An output table is produced with a set of runtime independent function/member names, their corresponding runtime dependent function member names, and their locations in each management component source code.

A runtime dependency processor (processing module) 22 applies the mapping data from the runtime mapping module 20 (mapping table) into the isolation layers from the runtime dependency analysis 18. Each management component 10 is re-factored into two distinct modules: a runtime independent module that has all the runtime dependent code replaced by corresponding runtime independent counterparts; and a runtime dependent proxy module that implements all the runtime independent code that was replaced. In this manner, the runtime framework dependencies are transferred to the runtime dependent proxy module. By automating the production of multiple runtime dependent proxy modules, the same base code is enabled for multiple runtime frameworks. It is then deployed together with its appropriate runtime dependent proxy module each time a new runtime framework is used.

The output of the runtime dependency processor 22 is applied and is a collection of: a) isolated logic code that delegates runtime-dependent functions/methods/arguments to runtime-independent proxy components hacked by runtime-dependent implementations; and b) multiple runtime-dependent implementations or "runtime-dependent proxies" to support each of the runtime-independent proxy components.

By automating the unification of runtime framework ontologies and automated isolation of runtime dependent code in the build process of systems management applications, the scope of these applications are significantly expanded, allowing them to support more easily different customer scenarios and drastically reducing the amount of resources needed to create and maintain their support to these multiple runtime frameworks.

Figure 2:
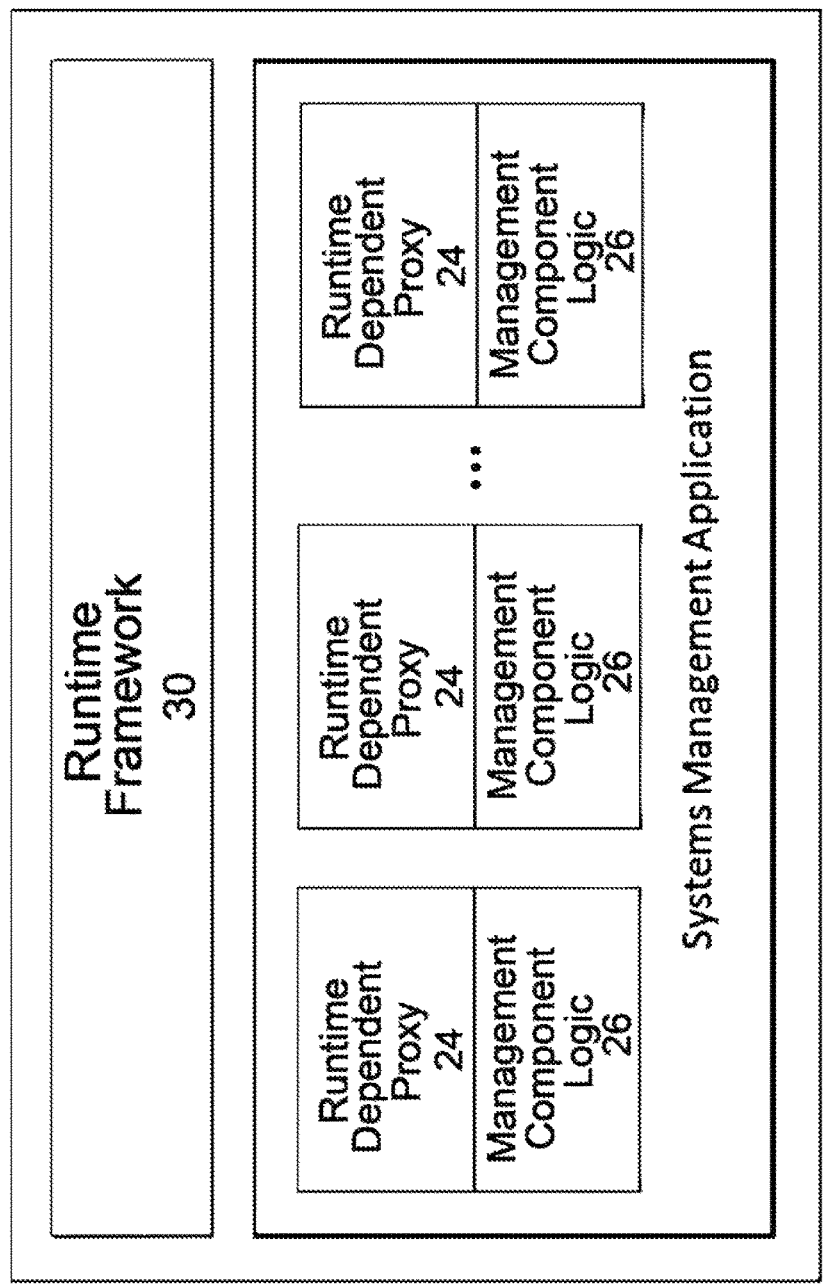
FIG. 2 depicts a detailed schematic of the architecture of the present invention.

FIG. 2 depicts a detailed schematic of the new architecture of the present invention. Runtime-dependent pieces of each management component 10 are separated in each of the runtime-dependent proxies 24 associated with that component. The management component logic element 26 calls only generic runtime-independent methods and members that are resolved by its associated runtime-dependent proxy 24. For each dependent runtime framework 30, a different runtime-dependent proxy 24 is generated by the runtime dependency processor module 22.

A simple methodology of the present invention would start with the scanning of the frameworks. Then individual function models are created. The application program interface (API) calls are then mapped to a generic API call layer by associating the functions together.

The application of algorithms used in the runtime dependency analysis element for automatic ontology unification (or Alignment) in the Systems Management realm is unique to the present invention. Typically, automatic ontology alignment algorithms deal with the mapping for resolution of semantics associated to Web Pages, and its domain of application is properly called the Semantic Web. However, it is noted that the prior art does not specify that ontology alignment mechanisms could be applied for automatic support of multiple runtime frameworks in systems management applications. In fact, there are not many domains where semantic alignment has been applied and documented.

Ontology alignment algorithms are applied to the problem of unifying component functions in a multi-runtime systems management environment. Given that each runtime-dependent framework ontology is created, a semantic mapping can be generated that can then be easily used to generate multiple proxy support for systems management applications.

The key for these algorithms is to have the runtime framework ontologies themselves being defined a priori in a way that is consumable by Semantic Web ontology alignment algorithms. Protégé from Stanford University can read Ontology Web Language (OWL) and apply such algorithms for unification and alignment. However, this is insufficient to perform the methodology of the present invention. An extra module that will process the unified ontology mapping and produce sets of proxies and specific logic implementation elements is further required.

Thus, the runtime dependency processor 22 has been introduced. The output of the runtime dependency analysis step 18 is a mapping of Ontologies. Each specific runtime framework ontology 16 is processed and aligned with a unified ontology. The unification is performed at the semantic level and can be done with different approaches (e.g. dictionary-based, structural comparison, or a combination of both approaches).

The runtime dependency processor (processing module) 22 element will read the unified ontology and automatically generate proxy components for the systems management software. These Proxy components are runtime-independent when used from the viewpoint of the system management application. The system management application will not be adversely affected if a particular component, such as discovery of a new storage system, runs in a different runtime framework. For example, an IBM system management application, IBM Director, may be running under OSGi and the new storage system component may be running under JBoss (which is a known and widely used application container acting as a runtime framework). With the code output from the runtime dependency processor 22 the IBM Director application can use the proxy component while the implementation that is runtime-dependent will be shielded from it and automatically generated.

The unified ontology is used to create the proxies that are runtime-independent, while the mapping relationships that point to each specific runtime framework ontology will supply what is needed to generate the runtime-dependent portions.

For exemplary purposes, consider two storage-related functions that both query free available space running in two different framework environments: a) StorageElement1 runs under Framework1 and uses the queryFreeDiskSpace(context) method; and b) StorageElement2 runs under Framework2 and uses the getAvailableSpace(id) method.

In this example above, the unification algorithm of the present invention would see that both methods are semantically equivalent and unify them into a unified ontology where the method could be called, for example, retrieveAvailableSpace(component).

The runtime dependency processor module would examine the unified ontology and the mapping back to each framework-specific ontologies, and automatically generate delegation code such as the following:

```
long retrieveAvailableSpace(component) {
if (framework = Framework1) {
context = Framework1Proxy.getContextFromComponent(component)
return Framework1Proxy.queryFreeDiskSpace(context)
}
else if (framework = Framework 2) {
id = Framework2Proxy.getComponentId(component)
return Framework2Proxy.getAvailableSpace(id)
}
}
```

This represents a very simplified example. In contrast, in a more accurate (involved) real-life example, the syntax of the results might also differ, the mapping could be more complex than a one-to-one mapping between ids/context/component, or the function being performed would need to call additional functions in the framework before being ready to be called from the proxy. The algorithm for code generation implemented by the runtime dependency processor 22 must take all these issues into account.

The present invention introduces an ontology-based code generation element which is utilized within a method for automatic conversion of existing systems management software applications to run in multiple middleware runtime frameworks without a full rewrite of their application source code.

While the present invention has been particularly described, in conjunction with an embodiment, it is evident that many alternatives, modifications and variations will be apparent to those skilled in the art in light of the foregoing description. It is therefore contemplated that the appended claims will embrace any such alternatives, modifications and variations as failing within the true scope and spirit of the present invention.

What is claimed is:

1. A computer program product for automatic conversion of existing systems management software applications to run in multiple middleware runtime frameworks, the computer program product comprising:
a non-transitory readable storage medium having stored thereon program instructions executable by a processor to cause the processor to:
scan the frameworks of system management components to form individual function modules;
map application program interface calls to a generic applicant program interface call layer by creating an association of the individual function modules;
perform runtime dependency analysis by generating ontology alignment mechanisms and outputting a mapping table of ontologies;
perform model unification by mapping runtime dependent functions to semantic counterparts using the ontology alignment mechanisms;
generate multiple runtime independent proxy components for the system management components; and
automatically refactor each of the system management components into two modules: a runtime independent module and a runtime dependent proxy module, wherein the runtime independent module replaces runtime dependent code with runtime independent code counterparts, wherein the model unification is dictionary-based, structure-based, or a combination thereof.

2. The computer program product of claim 1, wherein the instructions are further executable by the processor to cause the processor to: read unified ontologies and generate the multiple runtime independent proxy components from mapping relationships.

3. The computer program product of claim 1, wherein the instructions are further executable by the processor to cause the processor to: apply an output of a runtime dependency processing module to a collection of isolated logic code that delegates the runtime dependent functions, methods, or arguments to runtime independent proxy components supported by runtime dependent implementations.

4. The computer program product of claim 3, wherein the runtime dependent implementations support each of the runtime independent proxy components.

5. The computer program product of claim 2, wherein the instructions are further executable by the processor to cause the processor to: iterate through each of the system management component source code to identify members and methods that are runtime dependent.

6. The computer program product of claim 1, wherein dictionary-based model unification includes assigning a semantic meaning of an ontological element and comparing the semantic meaning to other ontological elements by identifying semantically equivalent constructs.

7. The computer program product of claim 1, wherein structure-based model unification includes forming a relationship between system management components and combining two or more distinct sub-structures.

8. The computer program product of claim 1, wherein the instructions are further executable by the processor to cause the processor to: combine an output of an algorithmic component with an output of the runtime mapping module unification to form an automatic proxy substitution mapping for each runtime dependent code in each system management component.

9. The computer program product of claim 3, wherein the runtime dependent proxy module implements the runtime independent code counterparts, transferring runtime framework dependencies to the runtime dependent proxy modules.

* * * * *